(12) United States Patent
Nepomniachtchi et al.

(10) Patent No.: US 8,724,924 B2
(45) Date of Patent: May 13, 2014

(54) SYSTEMS AND METHODS FOR PROCESSING MOBILE IMAGES TO IDENTIFY AND EXTRACT CONTENT FROM FORMS

(71) Applicant: Mitek Systems, San Diego, CA (US)

(72) Inventors: Grigori Nepomniachtchi, San Diego, CA (US); Vitali Kliatskine, San Diego, CA (US); Vladimir Kluzner, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 0 days.

(21) Appl. No.: 13/844,511

(22) Filed: Mar. 15, 2013

(65) Prior Publication Data

US 2013/0294697 A1 Nov. 7, 2013

Related U.S. Application Data

(63) Continuation-in-part of application No. 13/663,450, filed on Oct. 29, 2012, now Pat. No. 8,483,473, which is a continuation-in-part of application No. 12/906,036, filed on Oct. 15, 2010, now Pat. No. 8,577,118, which is a continuation-in-part of application No. 12/778,943, filed on May 12, 2010, now Pat. No. 8,582,862, which is a continuation-in-part of application No. 12/346,026, filed on Dec. 30, 2008, now Pat. No. 7,978,900.

(60) Provisional application No. 61/022,279, filed on Jan. 18, 2008.

(51) Int. Cl.
*G06K 9/00* (2006.01)

(52) U.S. Cl.
USPC .......................... 382/276; 382/295; 382/296

(58) Field of Classification Search
CPC ........ G06K 9/6211; G06T 11/60; G06T 3/00; G06T 3/20; G06T 2207/20041; G06T 2219/2016
USPC .......... 382/100, 192, 216, 276, 284, 295–296
See application file for complete search history.

(56) References Cited

U.S. PATENT DOCUMENTS

| | | | | |
|---|---|---|---|---|
| 7,636,483 | B2 * | 12/2009 | Yamaguchi et al. | 382/239 |
| 7,817,854 | B2 * | 10/2010 | Taylor | 382/168 |
| 8,160,149 | B2 * | 4/2012 | Demos | 375/240.16 |
| 8,374,383 | B2 * | 2/2013 | Long et al. | 382/100 |
| 2008/0193020 | A1 * | 8/2008 | Sibiryakov et al. | 382/209 |

* cited by examiner

*Primary Examiner* — Shefali Goradia
(74) *Attorney, Agent, or Firm* — Procopio, Cory, Hargreaves & Savitch LLP; Noel C. Gillespie

(57) ABSTRACT

Systems and methods for matching a received image with a template image are disclosed herein. Such systems and methods can advantageously enable an image captured by a mobile device (such as a smartphone or digital camera) to be correctly identified by the processing application. In some embodiments, the received image is first resized in one or both dimensions in order to match or approximately match the dimensions of a given template. The received image and template image can then be superimposed. Next, an optimal translative transformation value can be calculated in order to generate a confidence level for the current possible match. After confidence levels for each template are generated and recorded, the template with the highest confidence level can be selected as the best match for the received image.

21 Claims, 10 Drawing Sheets

PRIOR ART

FIG. 1

PRIOR ART

FIG. 2

PRIOR ART

FIG. 3

SYSTEMS AND METHODS FOR PROCESSING MOBILE IMAGES TO IDENTIFY AND EXTRACT CONTENT FROM FORMS

RELATED APPLICATIONS

This application is a continuation in part of co-pending U.S. patent application Ser. No. 13/663,450 filed Oct. 29, 2012, which in turn claims priority as a continuation in part of copending U.S. patent application Ser. No. 12/906,036, filed on Oct. 15, 2010, which in turn claims priority as a continuation in part of copending U.S. patent application Ser. No. 12/778,943, filed May 12, 2010, as well as a continuation in part of U.S. patent application Ser. No. 12/346,026, filed Dec. 30, 2008, now U.S. Pat. No. 7,978,900, which in turn claims the benefit of U.S. Provisional Application No. 61/022,279, filed Jan. 18, 2008, all of which are incorporated herein by reference in their entireties as if set forth in full.

BACKGROUND

1. Field of the Invention

Various embodiments disclosed herein relate generally to the field of image processing. More specifically, various embodiments disclosed herein are directed to systems and methods for processing an image of a form so that it can be properly compared with a template image for extraction of relevant content.

2. Related Art

Certain software applications enable a user to electronically transmit an image of a document to a processing party rather than delivering the actual document itself. For example, a user can place a check inside a flatbed scanner in order to create a scanned image of the check, and then subsequently upload this scanned image to a remote server associated with his bank. Once received by the remote server, the uploaded image can then be algorithmically analyzed in order to identify specific content that has been written or printed on the check (e.g., the payor, the payee, the date, the bank to draw funds from, the total amount to be paid, etc.). In this manner, a user can essentially deposit a check by uploading an image of it to the bank, rather than having to travel to a bank teller or to an ATM for physical delivery.

Note that the above example describes only one exemplary document image processing application (DIPA), and this application relates specifically to checks. However, a range of other services exist for processing other types of documents as well.

Due to the variety of services offered, when an electronic image is first received, it is often necessary to determine what type of document it is before attempting to engage in subsequent processing operations. Obviously, different types of documents exhibit different characteristics. For example, a check is typically going to have a much different presentation than a store rebate, in terms of its size, spacing, content, textual arrangement, and possibly also its orientation. Similarly, a store rebate will have different characteristics than a money order.

Note that even documents of the same type can have different formats. Consider, for example, if an application could be designed to correctly process images of W-2 tax forms. There are dozens of different types of W-2 forms presently in existence, and these forms can have differences ranging from slight variations (e.g., having essentially the same form layout, but printed using different software; compare, for example, the W-2 form of FIG. 1 with the W-2 form of FIG. 2) to W-2 forms that have different layouts entirely (compare, for example, the W-2 form of FIG. 3 with those depicted in FIGS. 1 and 2). In order to extract content from the document correctly, it is often first necessary to match the received image with an appropriate format/layout. Each possible format/layout is typically represented as a separate template stored in a database that is accessible by the server.

For example, a first template may be used to represent a first type of business check from a specific bank, while a second template can be used to represent a second type of business check from the same bank. In some cases, if enough similarity exists between two types of forms (e.g., as in the W2 forms depicted in FIGS. 1 and 2) a single template can be used to represent both forms.

Conventional technologies that are responsible for reading an image and matching it to a corresponding template, however, rely on a number of assumptions. The first assumption is that the size of the image received will be a fixed or predetermined size. The second assumption is that there will be a low level of distortion in the received image. Such assumptions, however, tend to only hold if the document is scanned inside a flatbed scanner.

When dealing with images recorded by a digital camera or other mobile device (for example, in a snapshot of a document taken by a smartphone), these assumptions can no longer be relied on. In these cases, the image acquired by the camera is often angularly distorted due to the fact that the photographer has targeted the document slightly off-axis (i.e., not perfectly aligned in an overhead position). Also, since the same document can be photographed at different distances, it can no longer be assumed that a document of a specific type will have a fixed or predetermined size. For these reasons, conventional technologies used to process electronic images do not tend to operate effectively (or even work at all) with images captured by mobile devices. Even in those applications that have the capability of processing mobile images, it is often the case that a separate "training" process must be employed in order to enable the application to have improved success with recognizing certain types of input images.

SUMMARY

Disclosed herein are systems and methods for matching a received image with a template image. Such systems and methods can advantageously enable an image captured by a mobile device (such as a smartphone or digital camera) to be correctly identified by the processing application. In some embodiments, the received image is first resized in one or both dimensions in order to match or approximately match the dimensions of a given template. The received image and template image can then be superimposed. Next, an optimal translative transformation value can be calculated in order to generate a confidence level for the current possible match. After confidence levels for each template are generated and recorded, the template with the highest confidence level can be selected as the best match for the received image.

In a first exemplary aspect, a computer readable medium is disclosed. In one embodiment, the computer readable medium comprises instructions which, when executed by a computer, perform a process of resizing a dimension of a received image to match or approximately match a corresponding dimension of template image, the process comprising: identifying a first set of lines in a received image and a second set of lines in a template image; selecting a first subset of lines from the first set of lines, and selecting a second subset of lines from the second set of lines, wherein each line of the first subset is longer than a first predetermined minimum length, and wherein each line of the subset is longer than a second predetermined minimum length; calculating distances between subsequent lines in the first subset, and calculating distances between subsequent lines in the second subset; calculating ratios between successive distances in the first subset, and calculating ratios between subsequent distances in the second subset; pairing ratios in the first subset with ratios in the second subset if the differences between two ratios exceeds a predetermined threshold of similarity; for each matching pair of ratios, calculating a ratio similarity coefficient that is less than or equal to a predetermined value; storing each ratio similarity coefficient in a similarity coefficient vector; sorting the vector; calculating a hypothesis similarity coefficient based at least in part upon the median of the sorted vector; from a set of all hypothesis similarity coefficients calculated in this manner, selecting the hypothesis similarity coefficient with the greatest value; and resizing the dimension of the received image based at least in part upon the selected hypothesis similarity coefficient.

In a second exemplary aspect, a computer readable medium is disclosed. In one embodiment, the computer readable medium comprises instructions which, when executed by a computer, perform a process of calculating an optimal translation transformation, the process comprising: identifying data items within a received image and within a template image; inflating the pixels of one or more of the data items according to their respective aspect ratios; creating a bounding rectangle for each inflated item; for each corresponding pair of data items, calculating the difference between the geometric centers of each respective bounding rectangle; creating a weighted sum of translation transformations, wherein the weighted sum comprises the values of each calculated difference; and determining a registration confidence level based at least in part upon the weighted sum.

In a third exemplary aspect, a computer readable medium is disclosed. In one embodiment, the computer readable medium comprises instructions which, when executed by a computer, perform a process of matching a received image to a corresponding template image, the process comprising: receiving an image; for a set of template images remaining: resizing one or both dimensions of the received image to match or approximately match a corresponding dimension of the current template image, calculating the optimal translation transformation of the received image relative to the current template image, recording a calculated confidence level that is based at least in part on the optimal translation transformation; and selecting the template image which has the highest confidence level.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

Figure 1:
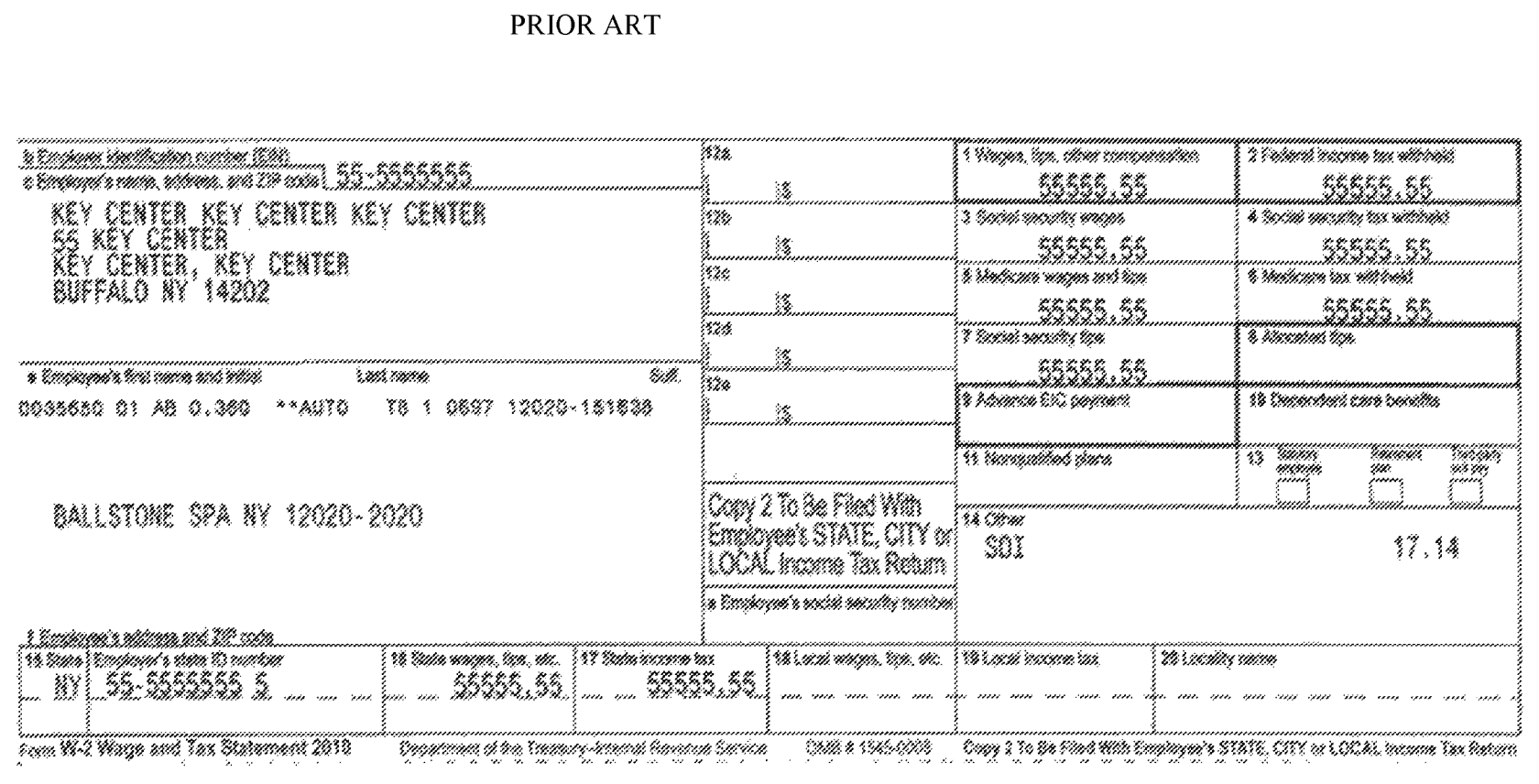

FIG. 1 is a screen capture of a first type of W2 form known in the art.

Figure 2:
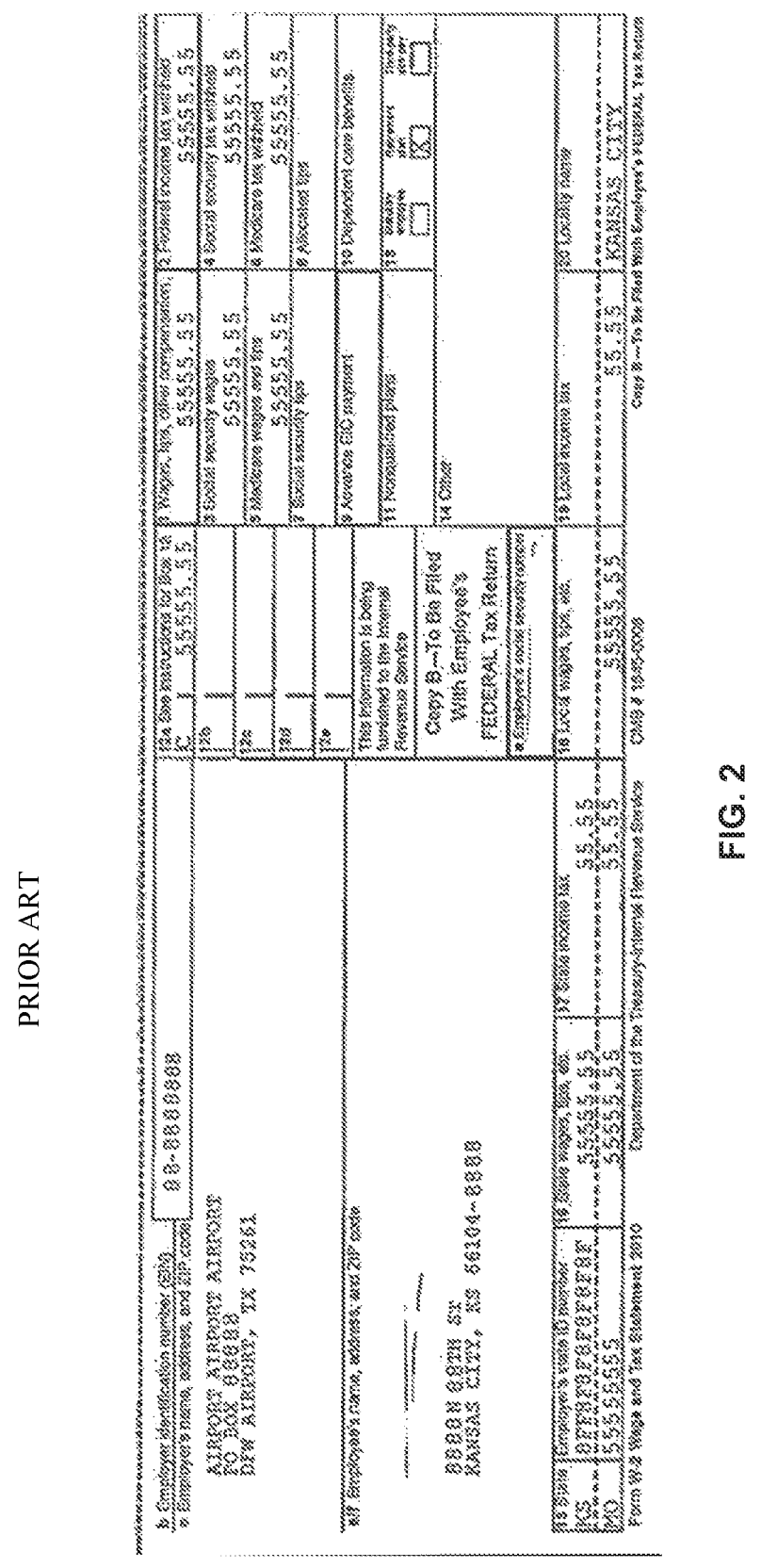

FIG. 2 is a screen capture of second type of W2 form known in the art.

Figure 3:
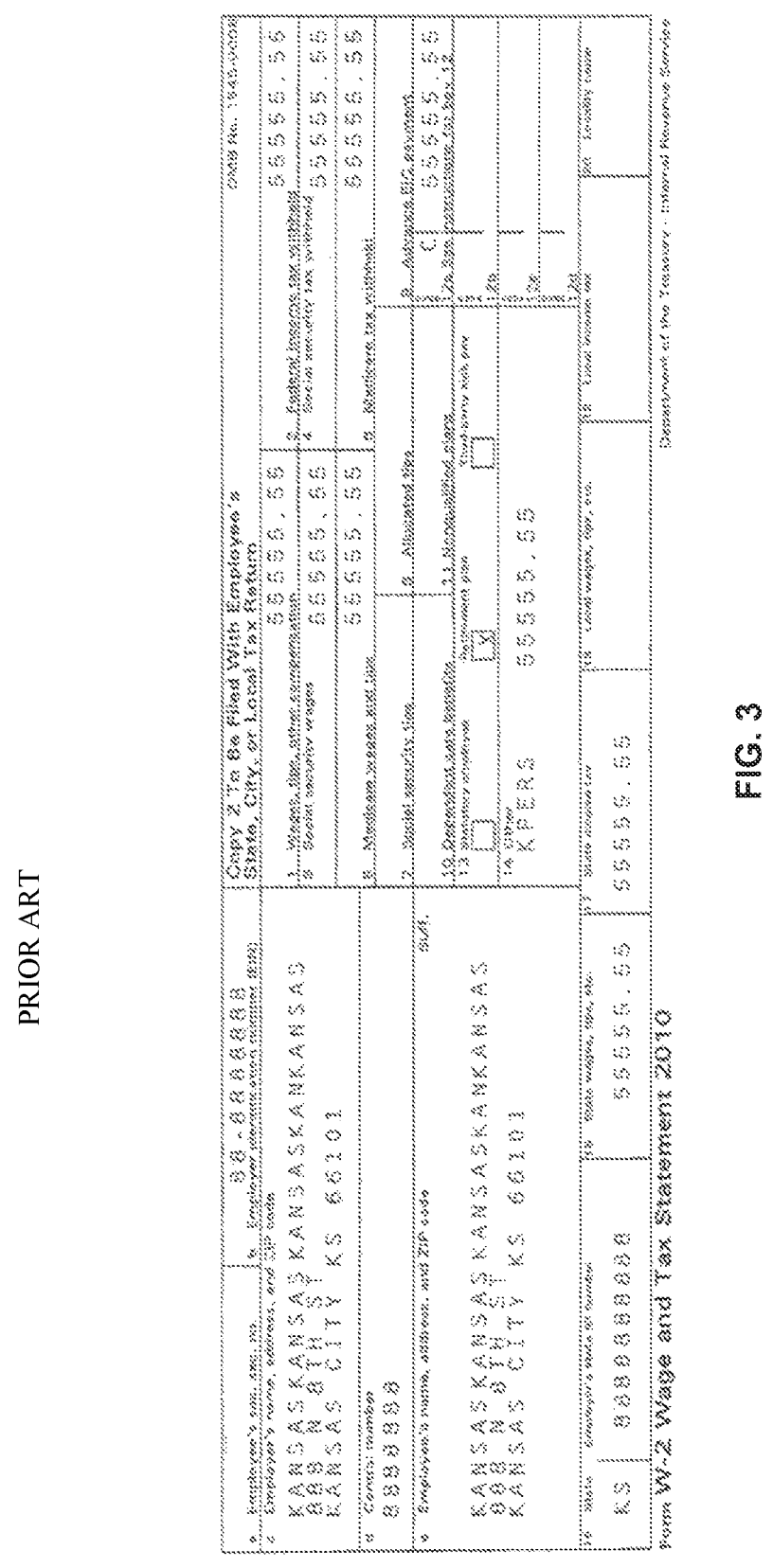

FIG. 3 is a screen capture of third type of W2 form known in the art.

The various embodiments mentioned above are described in further detail with reference to the aforementioned figured and the following detailed description of exemplary embodiments.

DETAILED DESCRIPTION

Figure 4:
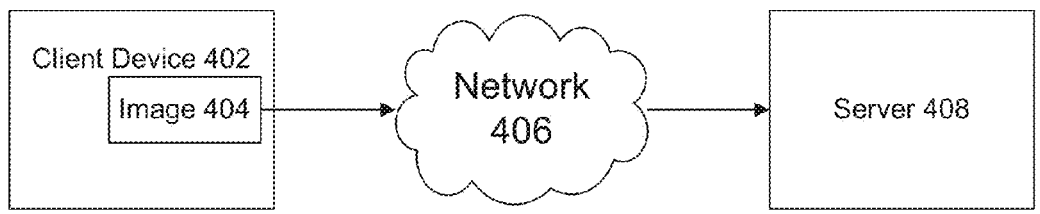
FIG. 4 is block diagram of an exemplary network topology that can be used with various embodiments described herein.

FIG. 4 is block diagram of an exemplary network topology that can be used in accordance with various embodiments described below. As shown by this figure, a client device 402 can interface with a server 408 over a connected network.

Client device 402 can be any type of computing device, including, without limitation, desktop computers, laptop/notebooks, tablets, smartphones, personal data assistants (PDAs), digital cameras, digital audio/mp3 players, digital video recorders, cable set-top boxes, and video game consoles.

Resident within memory of client device 402 is an image 404 of a document. Image 404 can be an image taken from a local image capture module, such as an image taken from the camera of a smart phone. Alternatively, image 404 can be an image received from a connected peripheral device, such as a flatbed or handheld scanner. Image 404 can also be an image received remotely from another computing device, for example, an image that has been uploaded to the client device 402 from a user's own PC or from a remote image server (not shown).

Client device 402 can transmit the image 404 to server 408 over a connected network 406, such as the Internet. While many embodiments disclosed herein utilize the Internet for communication between the client device 402 and the server 408, note that network 406 can be any telecommunications or data network including, without limitation, cable networks, satellite networks, optical networks, cellular networks, and bus networks (including MANs, WANs, LANs, WLANs, internets, and intranets). Such networks or portions thereof can utilize any one or more different topologies (e.g., ring, bus, star, loop, etc.), transmission media (e.g., wired/RF cable, RF wireless, millimeter wave, hybrid fiber coaxial, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

Server 408 can be a computing device adapted to receive and process electronic images of documents, such as image 404. Note that the functionality provided by the server 408 can depend specifically upon the type of application employed by a processing agency. For example, in a check processing application, the server 408 can be associated with a bank, financial institution, or contracted agency that specifically services check deposits for bank customers. Note also that the above application only represents one possible type of server 408 which can be employed with the embodiments described herein. However, myriad other types of servers and server functionalities can be used in lieu of or in addition to the exemplary server 408 described above.

Additionally, while server 408 is depicted in the singular, persons skilled in the art will understand that a plurality of servers 408 or other computing devices can cooperate to perform the functions described below. For example, according to some embodiments, various techniques in distributed networking can be used to split up the described tasks among a plurality of different computing devices.

Figure 5:
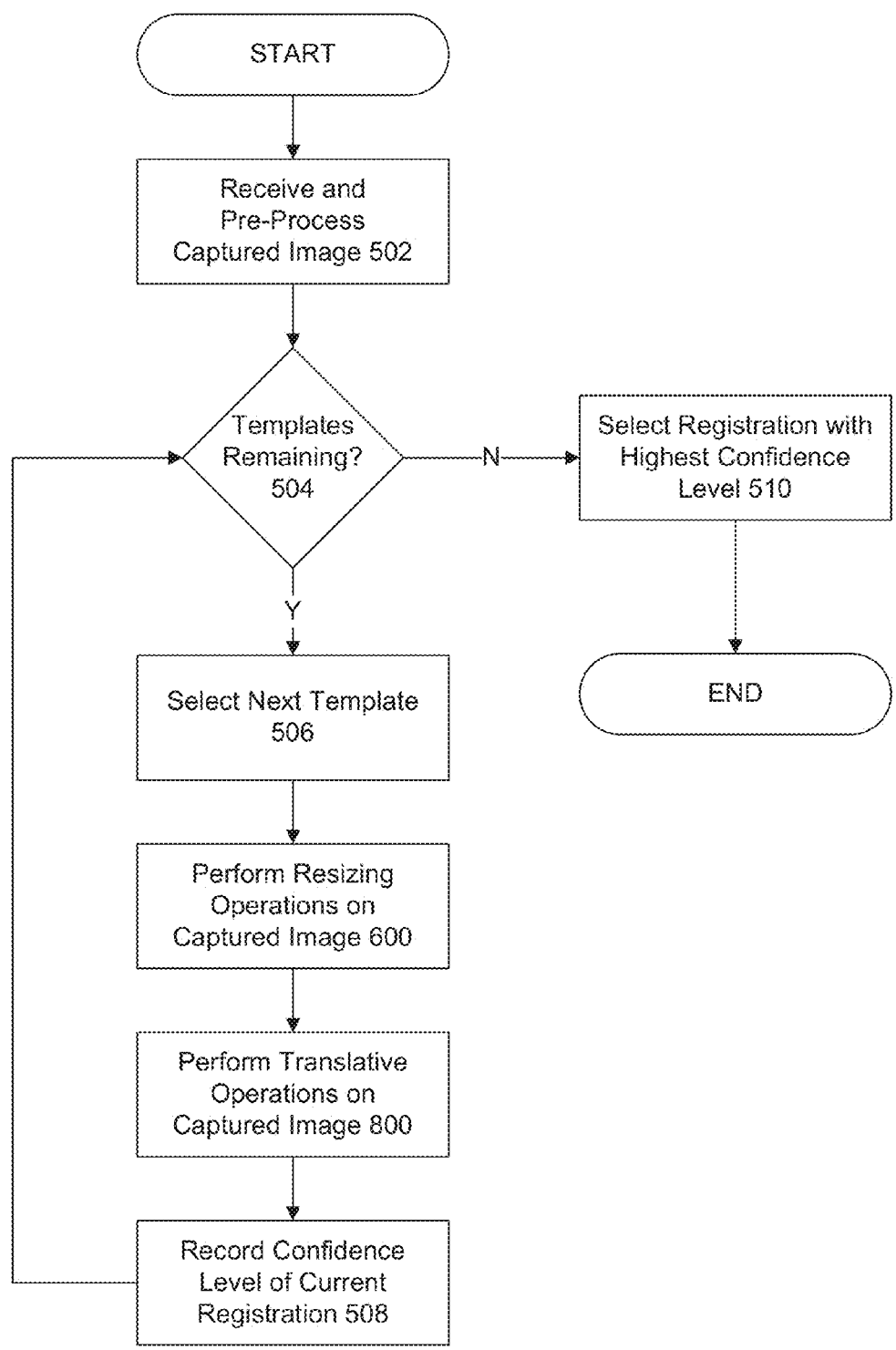
FIG. 5 is a flow diagram illustrating an exemplary method of processing an image for template comparison according to one embodiment.

FIG. 5 is a flow diagram illustrating an exemplary method of processing an image for template comparison according to one embodiment. To better facilitate the reader's understanding of this method, FIG. 5 depicts this method at a high level, hiding certain details from the reader. These details, however, are described subsequently with reference to FIGS. 6-8 and accompanying text.

At block 502, an electronic image is received, for example, at a server assigned to receive and analyze such images. This electronic image need not necessarily be an image captured from a mobile device, such as a digital camera or smart phone, but can also be an image captured from a flatbed scanner or from some other type of electronic device. That is to say, various embodiments of the method described below are capable of functioning with a wide variety of image inputs, not just images which have been photographed by a mobile device.

Note that an initial assumption with reference to FIG. 5 is that the received image has been deskewed and correctly oriented (landscape or portrait); however, various embodiments described below can still process images that are incorrectly oriented or upside-down. If the received image has not already been deskewed and properly oriented in this fashion, a number of preprocessing steps can first be performed in order to place the received image in this initial state. For example, image enhancement software can be used to detect skew and/or the vertical orientation of text. Both of these defects can then be corrected by applying one or more rotations to the received image.

At decision block 504, a decision is made as to whether there exist additional templates to compare against the received image. If more templates exist (as they typically will during the first iteration of this method), the next template for comparison is then selected at block 506. In some embodiments, the entire set of previously recorded templates can be traversed, for example, one template at a time, for comparison against the received image. In other embodiments, however, if a first template does not match the received image, an entire subset of templates that are similar to the first template can be removed as eligible candidates for comparison with the received image. This process can advantageously shorten the total processing time required for this method to execute.

At block 600, one or more resizing operations can be performed on the received image. A more comprehensive explanation of how these resizing operations are performed is described subsequently with reference to FIG. 6 and accompanying text. At a general level, however, the resizing operations operate to adjust the height and width of the received image so that it matches or approximately matches the height and width of the current template. Some level of image scaling and/or image stretching can take place in order to ensure that the dimensions of the received image match or approximately match the dimensions of the current template.

At block 800, various translation operations are performed on the received image in order to identify an optimal translative transformation. A more comprehensive explanation of how these translative operations function is described subsequently with reference to FIG. 8 and accompanying text. At a general level, however, a number of data items (horizontal lines, vertical lines, text, boxes, symbols) are identified on the template as well as on the received image. For each corresponding target symbol, the translative distance between them is measured when the documents are superimposed. This distance provides a numeric indicator as to whether that the documents are (or are not) of the same general format.

For example, if you were to superimpose the template of a check over a photograph of the same type of check from the same bank, where the size of the check in the photograph was approximately the size of the check in the template, you would expect the target boxes, lines, text, and symbols of each check to line up perfectly or near perfectly. In this case, the translative distance between targets would likely be zero or approximately zero, since you wouldn't have to translate one target any distance in order to align it with the other target. Conversely, if the images were superimposed and the targets identified on the template were positioned a significant distance away from the targets identified on the received image, such that there was gross misalignment, the translative differences would then be significant, providing numeric evidence that the received image is likely a different type of document than that of the current template.

By evaluating a number of separate translative differences in this manner, a weighted sum of these translative differences can then be calculated. This weighted sum can then be used to construct a confidence level indicating the likelihood that the received image is the same type of document as that of the template.

At block 508, the confidence level for the current possible match is recorded, for example, in a memory module. Control then passes back to decision block 504, and the process repeats until no templates are remaining.

At block 510, the registration with the highest confidence level is selected from the set of all registrations. As stated above, the registration with the highest confidence level is typically the likeliest format to match the received image. Note, however, that there can be certain instances when the likeliest match is still grossly dissimilar with the received image. This might occur, for example, if the user provided a completely different type of document (e.g., a news article) than the set of valid candidate documents expected by the application. Therefore, in some embodiments, a separate threshold can be used to ensure that the registration with the highest confidence level still exhibits a certain minimum level of similarity with the received image.

According to some embodiments, a user can be prompted to provide input to assist the algorithm in determining which type of template to select. This might be the case, for example, if multiple templates exceed a certain minimum threshold of similarity or otherwise appear to be good matches. After the appropriate registration has been selected, the process then ends.

The specific methods described below are used to compare the received image with a set of templates in order to find an optimal match. In some embodiments, this process contains two steps: size correction independently in two directions, followed by identifying an optimal translative transformation in order to generate a confidence level for the current possible match.

Figure 6:
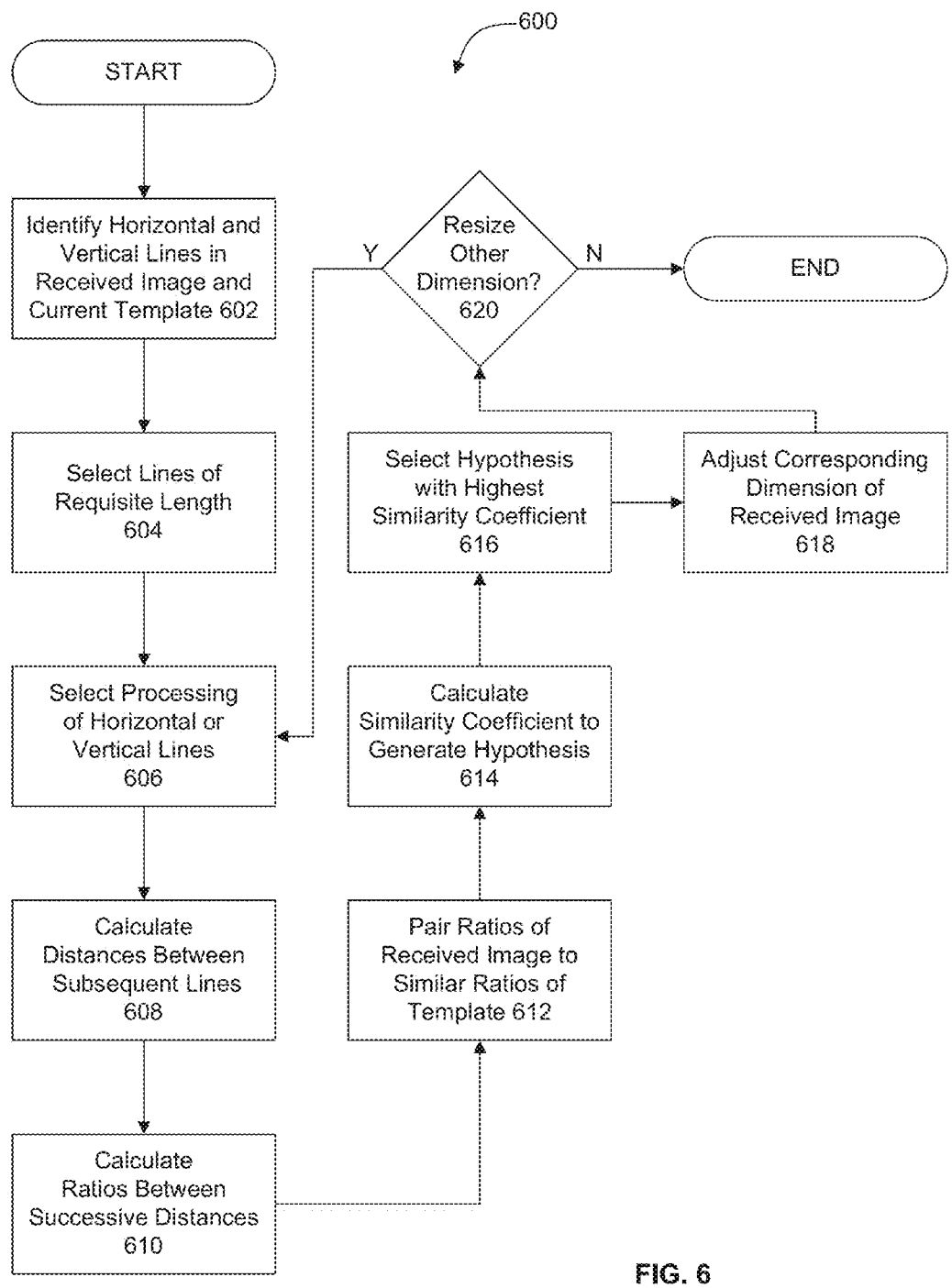
FIG. 6 is a flow diagram of the exemplary method of performing a size correction of the received image according to the embodiment depicted in FIG. 5.

FIG. 6 is a flow diagram of the exemplary method 600 of performing a size correction of the received image according to the embodiment depicted in FIG. 5.

At block 602, horizontal lines and vertical lines are identified in both the received image and the current template. Various techniques of line detection can be used to accomplish this purpose. In some embodiments, in order to trim down total processing time, line detection for each template is performed prior to the user uploading an image to the server. The results of line detection for each template can be already stored, for example, in a file, database, or other structure contained within memory.

At block 604, a first subset of lines is then selected from the received image, and a second subset of lines is selected from the template. In some embodiments, the lines to be selected are straight lines of a requisite minimum length. A threshold equal to some percentage of the longest line identified (where horizontal lines are analyzed separately from vertical lines) can be used to specify the minimum requisite length. In some embodiments, this threshold is 70%.

At block 606, a determination is made as to which type of lines (i.e., horizontal or vertical) will serve as the basis for input image size correction. In many cases, if the image or template has a portrait orientation, it will contain more horizontal lines than vertical ones. As such, the initial choice of horizontal lines can make more sense. Similarly, if the image or template has a landscape orientation, it will often contain more vertical lines than horizontal ones. In these situations, vertical lines can serve as a better initial choice. For simplicity, the description below assumes that horizontal lines have been selected, but note that the same concepts apply to vertical lines if "x coordinates" are substituted for "y coordinates", and "width" is substituted for "height."

At block 608, the distances between subsequent lines is calculated for both the received image and the template. Let $H_1^I, \ldots H_n^I$ denote the horizontal lines selected in the received image, and $H_1^T, \ldots H_n^T$ denote the horizontal lines selected in the template as represented from top to bottom. Further, let $dh_1^I, \ldots dh_{n-1}^I$ denote the differences between the y coordinates of successive horizontal lines in the image, and $dh_k^T, \ldots dh_{k-1}^T$ denote the differences between the y coordinates of successive horizontal lines in the template.

At block 610, the ratios between successive values of distances $dh_1^I, \ldots dh_{n-1}^I$ are calculated, along with ratios between successive values of distances $dh_1^T, \ldots dh_{k-1}^T$. The first set of ratios associated with the received image can be denoted by $rh_1^I, \ldots rh_{n-2}^I$, while the second set of ratios associated with the template can be denoted by $rh_1^T, \ldots rh_{k-2}^T$.

At block 612, the ratios given in the set $rh_1^I, \ldots rh_{n-2}^I$ are analyzed for similarity with the ratios in the set $rh_1^T, \ldots rh_{k-2}^T$. If similar values exist, a ratio in the set $rh_1^I, \ldots rh_{n-2}^I$ can be paired with a ratio from the set $rh_1^T, \ldots rh_{k-2}^T$. Note that the term "similar" as used above does not necessarily require a perfect match or perfect identity between ratios. In some embodiments, a threshold, a window, or a bound is used to ensure a requisite minimum level of similarity between two possible matching ratios.

Figure 7:
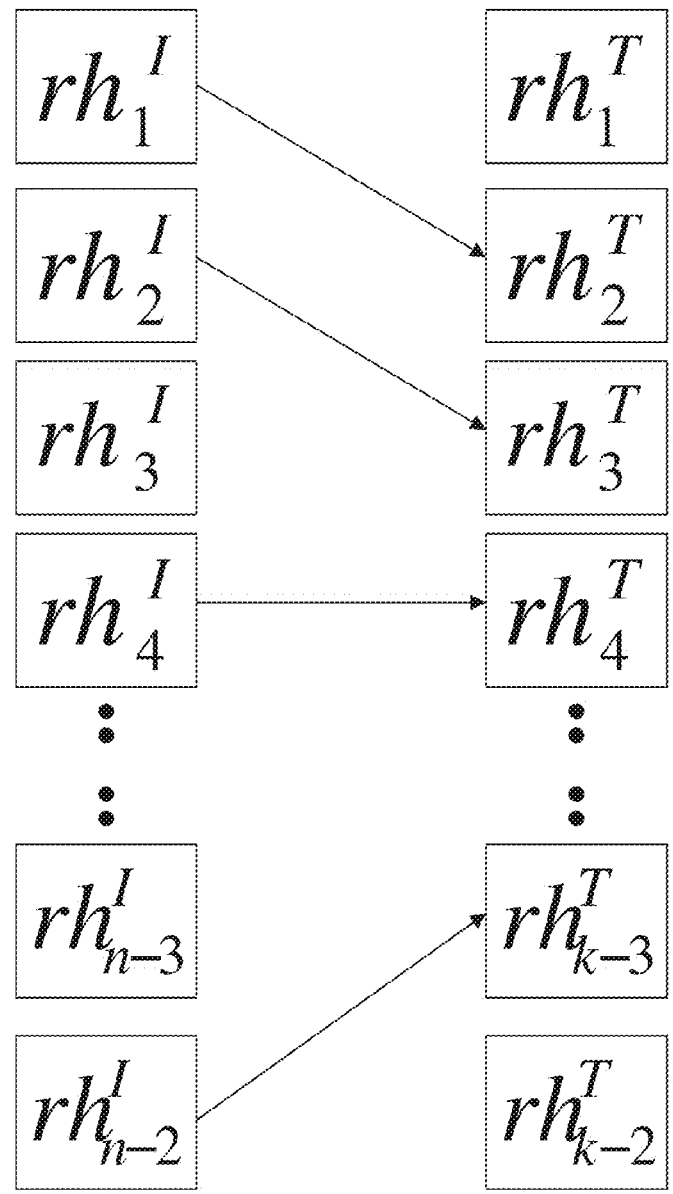
FIG. 7 is a block diagram illustrating an exemplary ratio pairing according to one embodiment.

FIG. 7 is a block diagram illustrating an exemplary pairing of ratios. Notice that in FIG. 7, not every ratio from the set $rh_1^I, \ldots rh_{n-2}^I$ need necessarily be paired with a ratio from the set $rh_1^T, \ldots rh_{k-2}^T$, and that no two ratios from $rh_1^I, \ldots rh_{n-2}^I$ are paired with the same ratio in $rh_1^T, \ldots rh_{k-2}^T$.

A similarity coefficient for every matching pair $(rh_{i(n)}^I, rh_{i(k)}^T)$ can then be constructed. This is shown at block 614. In some embodiments, this similarity coefficient can be defined as follows:

$$sh_i = \begin{cases} \dfrac{rh_{i(n)}^I}{rh_{i(k)}^T}, & rh_{i(n)}^I < rh_{i(k)}^T \\ \dfrac{rh_{i(k)}^T}{rh_{i(n)}^I}, & rh_{i(k)}^T < rh_{i(n)}^I \end{cases} \quad (1)$$

Such a definition guarantees that $sh_i \leq 1$ for every i. Then, each similarity coefficient calculated in this matter can then be included within a similarity coefficients vector $H = (sh_1, sh_2, \ldots sh_n)$ known as a hypothesis.

If M is the median of sorted vector H, then the similarity coefficient of hypothesis H can be defined as:

$$sh = M \frac{N}{\min(n-2, k-2)} \quad (2)$$

As suggested above, it is possible that in certain situations, the image was received in an upside down or otherwise incorrectly oriented position. In order to account for this possibility, in some embodiments, all of the above steps can be performed again comparing $rh_1^I \ldots rh_{n-2}^I$ with $rh_1^T, \ldots rh_{k-2}^T$ while taking the series in the opposite order, i.e., $rh_{n-2}^I \ldots rh_1^I$ and $rh_1^T \ldots rh_{k-2}^T$.

At block 616, the hypothesis with the highest similarity coefficient can then be selected from the set of all hypotheses. Because this hypothesis has the highest similarity coefficient, it is likely the best candidate to fit the target one-to-one correspondence compatibility between the horizontal lines of the received image and horizontal lines of the template.

At block 618, a dimension of the received image (in this case, its height) can then be adjusted to its new value. This can be accomplished, for example, by taking two pairs of corresponding horizontal lines from the received image and the template (e.g., the top and the bottom). The received image's height can then be corrected taking into account the ratio between y coordinates' difference of the received image's top and bottom horizontal lines and they coordinates' difference of the templates top and bottom horizontal lines.

If resizing the other dimension of the received image (in this case, the received image's width) is also necessary, at decision block 620, control can then pass back to block 606. In order to correct the received image's width, the length's ratios of corresponding pairs of image and templates vertical lines can then be calculated. The process can then repeat using the x coordinate instead of they coordinate. The correcting coefficient can be taken as a median of the sorted vector with these ratios.

Once one or both dimensions have been appropriately resized so as to match or approximately match the dimensions of the current template, the resizing operation can then end. Control can then resume at block 800 of the general process depicted in FIG. 5.

Figure 8:
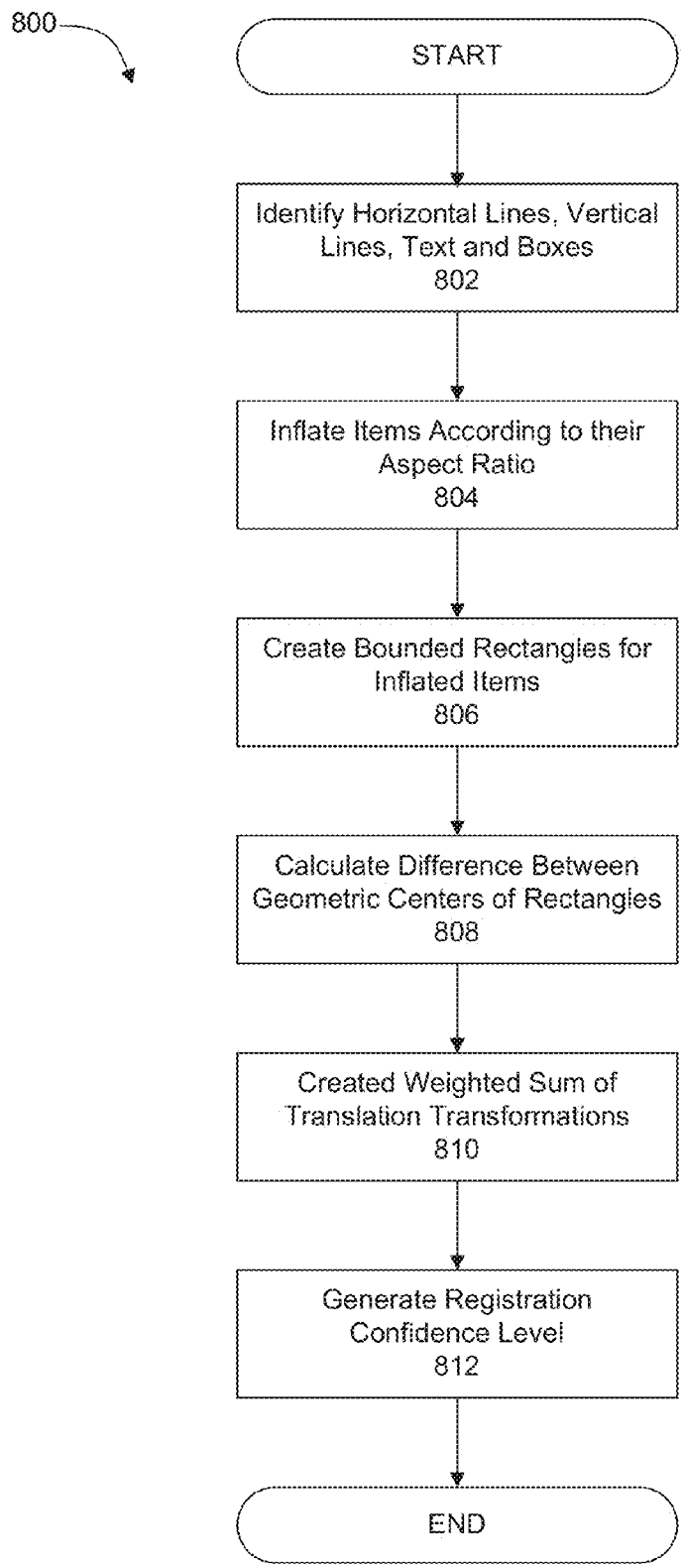
FIG. 8 is a flow diagram of the exemplary method of calculating an optimal translation transformation according to the embodiment depicted in FIG. 5.

FIG. 8 is a flow diagram illustrating an exemplary method 800 of calculating an optimal translation transformation according to the embodiment depicted in FIG. 5.

At block 802, four types of data items are identified in the received image and separately on the template. In some embodiments, these data items include: (a) horizontal lines; (b) vertical lines; (c) text; and (d) boxes. Existing techniques in line detection and text localization can be used to identify data items (a)-(c). With respect to (d), boxes with predetermined sizes can be found based on previously detected horizontal and vertical lines. These items can then be registered correspondingly with each other according to the following technique.

At block 804, the items are inflated according to their aspect ratio. For example, the horizontal lines and text can be inflated a number of pixels in a vertical direction, while the vertical lines can be inflated a number of pixels in a horizontal direction. The boxes can be inflated in both the vertical and horizontal directions.

At block 806, bounded rectangles can be generated for each of the inflated items. The differences between the geometric centers of corresponding rectangles can then be calculated at block 808.

The resulting translation transformation can be represented as the weighted sum of the four translation transformations above. This value is generated at block 810. The registration confidence level can be determined by calculating the weighted sum of cross-correlation coefficients of separate registrations. The process of calculating an optimal translation transformation and confidence level then ends, with process resuming at the general method of FIG. 5 at block 508.

Figure 9:
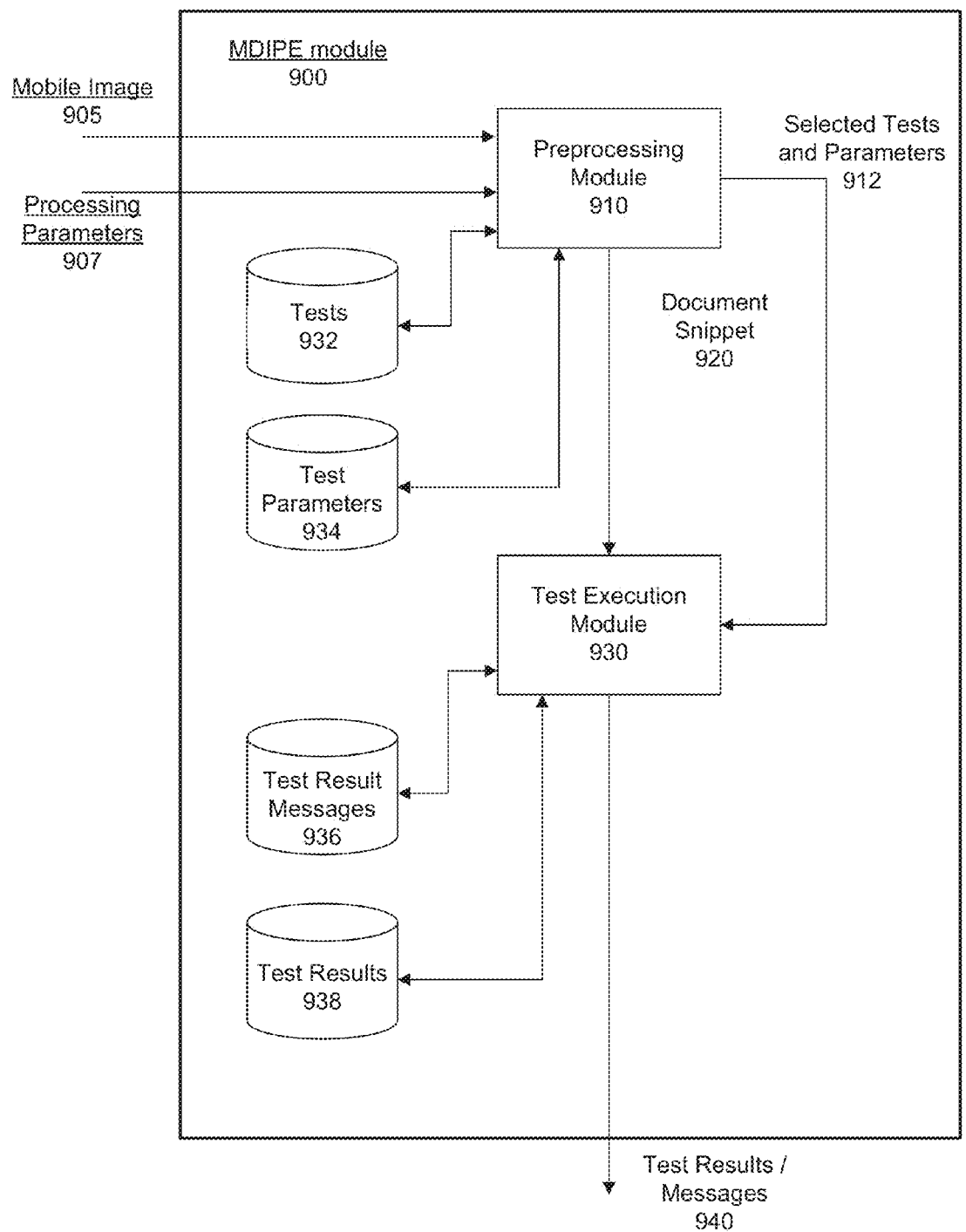
FIG. 9 is a block diagram illustrating an exemplary mobile document image processing engine module for performing tests on mobile document images according to one embodiment.

FIG. 9 illustrates an exemplary mobile document image processing engine (MDIPE) module 900 for performing quality assurance testing on mobile document images according to an embodiment. The exemplary mobile document image processing engine can be configured, for example, for use in server 408 depicted in FIG. 4.

The MDIPE module 900 can receive a mobile document image captured by a mobile device, or multiple mobile images for some tests; perform preprocessing on the mobile document image; select one or more tests to be performed on the mobile document image (such as matching a received image to a corresponding template for form identification as described above); and execute the selected tests. As depicted in FIG. 9, the MDIPE module 900 includes a preprocessing module 910 and test execution module 930. The preprocessing module 910 can be configured to receive a mobile image 905 captured using a camera of a mobile device as well as processing parameters 907. According to an embodiment, the mobile image 905 and the processing parameters 907 can be passed to MDIPE 900 by a mobile application resident with a mobile device.

The processing parameters 907 can include various information that the MDIPE 900 can use to determine which tests to run on the mobile image 905. For example, the processing parameters 907 can identify the type of device used to capture the mobile image 905, the type of mobile application that will be used to process the mobile image if the mobile image passes image quality and assurance testing (IQA), or both. The MDIPE 900 can use this information to determine which tests to select from test data store 932 and which test parameters to select from test parameter data store 934. For example, if a mobile image is being tested for a mobile deposit application that expects an image of a check, a specific set of tests related to assessing the image quality for a mobile image of a check can be selected, such as a magnetic ink character recognition (MICR) line test, or a test for whether an image is blurry, etc. The MDIPE 900 can also select test parameters from test parameters data store 934 that are appropriate for the type of image to be processed, or for the type of mobile device that was used to capture the image, or both. In an embodiment, different parameters can be selected for different mobile phones that are appropriate for the type of phone used to capture the mobile image. For example, some mobile phones might not include an autofocus feature.

The preprocessing module 910 can process the mobile document image to extract a document snippet that includes the portion of the mobile document that actually contains the document to be processed. This portion of the mobile document image is also referred to herein as the document subimage. The preprocessing module 910 can also perform other processing on the document snippet, such as converting the image to a grayscale or bi-tonal document snippet, geometric correction of the document subimage to remove view distortion, etc. Different tests can require different types of preprocessing to be performed, and the preprocessing module 910 can produce mobile document snippets from a mobile document image depending on the types of mobile IQA tests to be executed on the mobile document image.

The test execution module 930 receives the selected tests and test parameters 912 and the preprocessed document snippet (or snippets) 920 from the preprocessing mobile 910. The test execution module 930 executes the selected tests on the document snippet generated by the processing engine 930. The test execution module 930 also uses the test parameters provided by the preprocessing module 910 when executing the test on the document snippet. The selected tests can be a series of one or more tests to be executed on the document snippets to determine whether the mobile document image exhibits geometrical or other defects.

The test execution module 930 executes each selected test to obtain a test result value for that test. The test execution module 930 then compares that test result value to a threshold value associated with the test. If the test result value is equal to or exceeds the threshold, then the mobile image has passed the test. Otherwise, if the test result value is less than the threshold, the mobile document image has failed the test. According to some embodiments, the test execution module 930 can store the test result values for the tests performed in test results data store 938.

According an embodiment, the test threshold for a test can be stored in the test parameters data store 934 and can be fetched by the preprocessing module 910 and included with the test parameters 912 provided to the test execution module 930. According to an embodiment, different thresholds can be associated with a test based on the processing parameters 907 received by the preprocessing engine 910. For example, a lower threshold might be used for an image focus IQA test for image capture by camera phones that do not include an autofocus feature, while a higher threshold might be used for the image focus IQA test for image capture by camera phones that do include an autofocus feature.

According to an embodiment, a test can be flagged as "affects overall status." These tests are also referred to here as "critical" tests. If a mobile image fails a critical test, the MDIPE 900 rejects the image and can provide detailed information to the mobile device user explaining why the image was not of a high enough quality for the mobile application and that provides guidance for retaking the image to correct the defects that caused the mobile document image to fail the test, in the event that the defect can be corrected by retaking the image.

According to an embodiment, the test result messages provided by the MDIPE 900 can be provided to the mobile application that requested the MDIPE 900 perform the quality assurance testing on the mobile document image, and the mobile application can display the test results to the user of the mobile device. In certain embodiments, the mobile application can display this information on the mobile device shortly after the user takes the mobile document image to allow the user to retake the image if the image is found to have defects that affect the overall status of the image. In some embodiments, where the MDIPE 900 is implemented at least in part on the mobile device, the MDIPE 900 can include a user interface module that is configured to display the test results message on a screen of the mobile device.

FIG. 9 merely provides a description of the logical components of the MDIPE 100. In some embodiments, the MDIPE 900 can be implemented on the mobile device, in software, hardware, or a combination thereof. In other embodiments, the MDIPE 900 can be implemented on a remote server (such as server 408), and the mobile device can send the mobile image 905 and the processing parameters 907, e.g., via a wireless interface, to the remote server 908 for processing, and the remote server sends the test results and test messages 940 to the mobile device to indicate whether the mobile image passed testing. In some embodiments, part of the functionality of the MDIPE 900 can be implemented on the mobile device while other parts of the MDIPE 900 are implemented on the remote server. The MDIPE 900 can be implemented in software, hardware, or a combination thereof. In still other embodiments, the MDIPE 900 can be implemented entirely on the remote server, and can be implemented using appropriate software, hardware, or a combination there.

By employing various techniques described above, a received image can be correctly matched to a target template, even if the received image was captured on a mobile device such as a smartphone or a digital camera. Various embodiments mentioned above benefit from enabling a higher level of automation relative to conventional technologies (i.e., no "training" is required), significant tolerance to printing variations (when the same image is printed slightly differently), as well as a high throughput and low maintenance complexity.

Figure 10A:
FIG. 10A is an image of a template W-2 form which may be used for comparison with an image of a W-2 captured by a mobile device, in accordance with one embodiment of the invention.
Figure 10B:
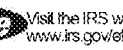
FIG. 10B is a mobile-captured image of a W-2 form which can be compared with the template in FIG. 10A.

FIG. 10A is an image of a template W-2 form which can be utilized for comparison with an image of a W-2 form captured by a mobile device, such as that illustrated in FIG. 10B. It is apparent that the image of the W-2 in FIG. 10B is larger than the template in FIG. 10A, which will require both height and width adjustments of the image. When line detection is performed on FIG. 10B with a 70 percent threshold (meaning 70% of the longest horizontal and 70% of the longest vertical lines are used), the line detection produces 7 horizontal lines and 4 vertical lines.

When extracting content from the image of the W-2 in FIG. 10B, additional logic functions may be carried out to verify the accuracy of the optical character recognition (OCR) process. For example, knowledge of the W-2 template may indicate that the content of a first box labeled "1" is almost always identical to the box labeled "3." Therefore, once the OCR process commences, the numbers obtained from these two boxes can be compared to determine if they are identical. If they are not, it may indicate that the content of the boxes was not accurately captured. Other logic may be utilized to verify that the W-2 form belongs to the user who is presenting it. This may include obtaining the user's name or address from a known name and address field on the W-2 form and comparing it with the name and address of the user who is having their tax filing prepared. Other relationships may be known, including mathematical relationships where a second field is the product of a specific equation being performed on a value in a first field, such that the mathematical formula may be applied to the value in the first field to determine if the value in the second field is identical to the result of the mathematical formula.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium containing instructions which, when executed by a computer, perform a process of resizing a dimension of a received image to match or approximately match a corresponding dimension of template image, the process comprising:

identifying a first set of lines in a received image and a second set of lines in a template image;

selecting a first subset of lines from the first set of lines, and selecting a second subset of lines from the second set of lines, wherein each line of the first subset is longer than a first predetermined minimum length, and wherein each line of the subset is longer than a second predetermined minimum length;

calculating distances between subsequent lines in the first subset, and calculating distances between subsequent lines in the second subset;

calculating ratios between successive distances in the first subset, and calculating ratios between subsequent distances in the second subset;

pairing ratios in the first subset with ratios in the second subset if the differences between two ratios exceeds a predetermined threshold of similarity;

for each matching pair of ratios, calculating a ratio similarity coefficient that is less than or equal to a predetermined value;

storing each ratio similarity coefficient in a similarity coefficient vector;

sorting the similarity coefficient vector;

calculating a hypothesis similarity coefficient based at least in part upon the median of the sorted similarity coefficient vector;

selecting the hypothesis similarity coefficient with the greatest value from a set of all hypothesis similarity coefficients; and resizing the dimension of the received image based at least in part upon the selected hypothesis similarity coefficient.

2. The computer readable medium of claim 1, wherein the first and second sets of lines consist of horizontal lines.

3. The computer readable medium of claim 1, wherein the first and second sets of lines consist of vertical lines.

4. The computer readable medium of claim 1, wherein the first predetermined minimum length is 70% of the length of the longest line of the first set of lines.

5. The computer readable medium of claim 1, wherein the second predetermined minimum length is 70% of the length of the longest line of the second set of lines.

6. The computer readable medium of claim 1, wherein a ratio of the first subset is paired to a single ratio of the second subset.

7. The computer readable medium of claim 1, wherein no more than a single ratio of the first subset is paired to a ratio of the second subset.

8. The computer readable medium of claim 1, wherein the process is repeated a second time, but while reversing the sequence of lines contained within the first subset in order to account for vertical inversion of the received image.

9. The computer readable medium of claim 1, wherein resizing the dimension of the received image is based at least in part upon a determined ratio, the determined ratio comprising a coordinate difference between a first and last line of the received image, and a coordinate difference between a first and last line of the template image.

10. The computer readable medium of claim 1, wherein the dimension is the height of the received image.

11. The computer readable medium of claim 1, wherein the dimension is the width of the received image.

12. A non-transitory computer readable medium containing instructions which, when executed by a computer, perform a process of calculating an optimal translation transformation, the process comprising: identifying data items within a received image and within a template image; inflating the pixels of one or more of the data items according to their respective aspect ratios; creating a bounding rectangle for each inflated item; for each corresponding pair of data items, calculating the difference between the geometric centers of each respective bounding rectangle; creating a weighted sum of translation transformations, wherein the weighted sum comprises the values of each calculated difference; and determining a registration confidence level based at least in part upon the weighted sum.

13. The computer readable medium of claim 12, wherein the data items comprise horizontal lines, vertical lines, text, and boxes.

14. The computer readable medium of claim 13, wherein the boxes are identified based at least in part upon previously detected horizontal and vertical lines.

15. The computer readable medium of claim 13, wherein if the data item is a horizontal line or text, inflating the pixels comprises inflating the data item for a number of pixels in a vertical direction.

16. The computer readable medium of claim 13, wherein if the data item is a vertical line, inflating the pixels comprises inflating the data item for a number of pixels in a horizontal direction.

17. The computer readable medium of claim 13, wherein if the data item is a box, inflating the pixels comprises inflating the data item for a number of pixels in a both a horizontal and a vertical direction.

18. The computer readable medium of claim 13, wherein determining the registration confidence level is determined based at least in part upon calculating a weighted sum of cross-correlation coefficients.

19. A non-transitory computer readable medium containing instructions which, when executed by a computer, performs a process of matching a received image to a corresponding template image, the process comprising: receiving an image; for a set of template images remaining: resizing one or both dimensions of the received image to match or approximately match a corresponding dimension of the current template image, calculating the optimal translation transformation of the received image relative to the current template image, recording a calculated confidence level that is based at least in part on the optimal translation transformation; and selecting the template image which has the highest confidence level.

20. The computer readable medium of claim 19, wherein resizing one or both dimensions of the received image to match or approximately match a corresponding dimension of the current template image further comprises:
   identifying a first set of lines in the received image and a second set of lines in the template image;
   selecting a first subset of lines from the first set of lines, and selecting a second subset of lines from the second set of lines, wherein each line of the first subset is longer than a first predetermined minimum length, and wherein each line of the subset is longer than a second predetermined minimum length;
   calculating distances between subsequent lines in the first subset, and calculating distances between subsequent lines in the second subset;
   calculating ratios between successive distances in the first subset, and calculating ratios between subsequent distances in the second subset; pairing ratios in the first subset with ratios in the second subset if the differences between two ratios exceeds a predetermined threshold of similarity;
   for each matching pair of ratios, calculating a ratio similarity coefficient that is less than or equal to a predetermined value;
   storing each ratio similarity coefficient in a similarity coefficient vector;
   sorting the similarity coefficient vector;
   calculating a hypothesis similarity coefficient based at least in part upon the median of the sorted similarity coefficient vector;
   selecting the hypothesis similarity coefficient with the greatest value from a set of all hypothesis similarity coefficients calculated; and
   resizing a dimension of the received image based at least in part upon the selected hypothesis similarity coefficient.

21. The computer readable medium of claim 19, wherein calculating the optimal translation transformation of the received image relative to the current template image further comprises: identifying data items within the received image and within the template image; inflating the pixels of one or more of the data items according to their respective aspect ratios; creating a bounding rectangle for each inflated item; for each corresponding pair of data items, calculating the difference between the geometric centers of each respective bounding rectangle; creating a weighted sum of translation transformations, wherein the weighted sum comprises the values of each calculated difference; and determining a registration confidence level based at least in part upon the weighted sum.

* * * * *